United States Patent [19]
Wang et al.

[11] Patent Number: 5,297,278
[45] Date of Patent: Mar. 22, 1994

[54] SYSTEM FOR AUTHORIZED CONDITIONAL DELETION OF DATA OBJECTS WITHIN A LIBRARY SERVICE

[75] Inventors: Diana S. Wang, Trophy Club; Marvin L. Williams, Lewisville, both of Tex.

[73] Assignee: International Business Machines Corporation, Armonk, N.Y.

[21] Appl. No.: 528,655

[22] Filed: May 24, 1990

[51] Int. Cl.$^5$ .............................................. G06F 15/40
[52] U.S. Cl. ................................... 395/600; 395/145; 395/650; 364/DIG. 1; 364/419.1; 364/222.81; 364/225.4; 364/226.6
[58] Field of Search ............... 395/600, 575, 145, 650; 364/969.2, 969.4, 246.8, 200, 419

[56] References Cited

U.S. PATENT DOCUMENTS 4,503,499  3/1985  Mason et al. ..................... 364/200

OTHER PUBLICATIONS

"An Introduction to Database Systems", C. J. Date, pp. 413–446, 1986, Addison-Wesley.

*Primary Examiner*—Thomas C. Lee
*Assistant Examiner*—Wayne Amsbury
*Attorney, Agent, or Firm*—Andrew J. Dillon

[57] ABSTRACT

A method is disclosed for the conditional deletion of selected data objects within a data processing system. In a data processing system having a plurality of data objects stored within a library service, it is common for a selected data object to be utilized or temporarily removed by a system user. In response to a request to delete a selected data object, a determination is first made whether the data object in question is in use or temporarily removed from the library service. If the data object to be deleted is in use or temporarily removed, the deletion of that data object is automatically halted in accordance with the method of the present invention. In one embodiment of the present invention, the deletion of a selected data object may be temporarily deferred in response to a determination that the data object is in use or temporarily removed, until such time as the data object is returned to the library service or no longer in use. In each disclosed embodiment of the present invention, the authority to delete a particular data object is determined prior to permitting such deletion.

2 Claims, 3 Drawing Sheets

SYSTEM FOR AUTHORIZED CONDITIONAL DELETION OF DATA OBJECTS WITHIN A LIBRARY SERVICE

BACKGROUND OF THE INVENTION

1. Technical Field

The present invention relates in general to methods for improving data processing systems, and in particular to methods for maintaining data integrity within data processing systems. Still more particularly, the present invention relates to methods and systems for conditionally deleting data objects within a data processing system.

2. Description of the Related Art

It is common within known data processing systems to group a plurality of data objects or documents within a library service so that these data objects may be utilized and/or temporarily removed by users within the system. As is typical in these known systems, the ability of a particular user to utilize or temporarily remove a particular data object is selectively defined by setting forth a level of authority which that user may enjoy with regard to a particular data object.

For example, a particular user may be authorized to read a particular document but not to copy or delete that document. However, in the case of each document within a data processing service, a particular user designated as the owner of that document, or a user given the highest level of authority with regard to that document, may specify that a particular document be deleted from the library service wherein that document is maintained.

This particular activity can create a problem in known data processing system environments in that a document owner or a user with sufficient authority may request that a document be deleted and have the library service responsible for that document delete the document, regardless of whether the document is in use or temporarily removed from the library service by a second user. In the case of a document which has been temporarily removed, known library services will delete all references to that document and an error message will be generated upon an attempt by a second user to check the document back into the library service. Of course, those skilled in the art will appreciate that the deletion of a document by the document owner while the document is in use by a second user will clearly have a negative impact on data integrity and perceived user-friendliness within the data processing system.

Therefore, it should be obvious that a need exists for a method and system whereby the deletion of a document from a library service within a data processing system may be conditioned upon the document being resident within the library service and not being currently in use by a second user.

SUMMARY OF THE INVENTION

It is therefore one object of the present invention to provide a method of improving data processing systems.

It is another object of the present invention to provide an improved method for maintaining data integrity within a data processing system.

It is yet another object of the present invention to provide an improved method and system for conditionally deleting a data object within a data processing system.

The foregoing objects are achieved as is now described. In a data processing system having a plurality of data objects stored within a library service, it is common for a selected data object to be utilized or temporarily removed by a system user. In response to a request to delete a selected data object, a determination is first made whether the data object in question is in use or temporarily removed from the library service. If the data object to be deleted is in use or temporarily removed, the deletion of that data object is automatically halted in accordance with the method of the present invention. In one embodiment of the present invention, the deletion of a selected data object may be temporarily deferred in response to a determination that the data object is in use or temporarily removed, until such time as the data object is returned to the library service or no longer in use. In each disclosed embodiment of the present invention, the authority to delete a particular data object is determined prior to permitting such deletion.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
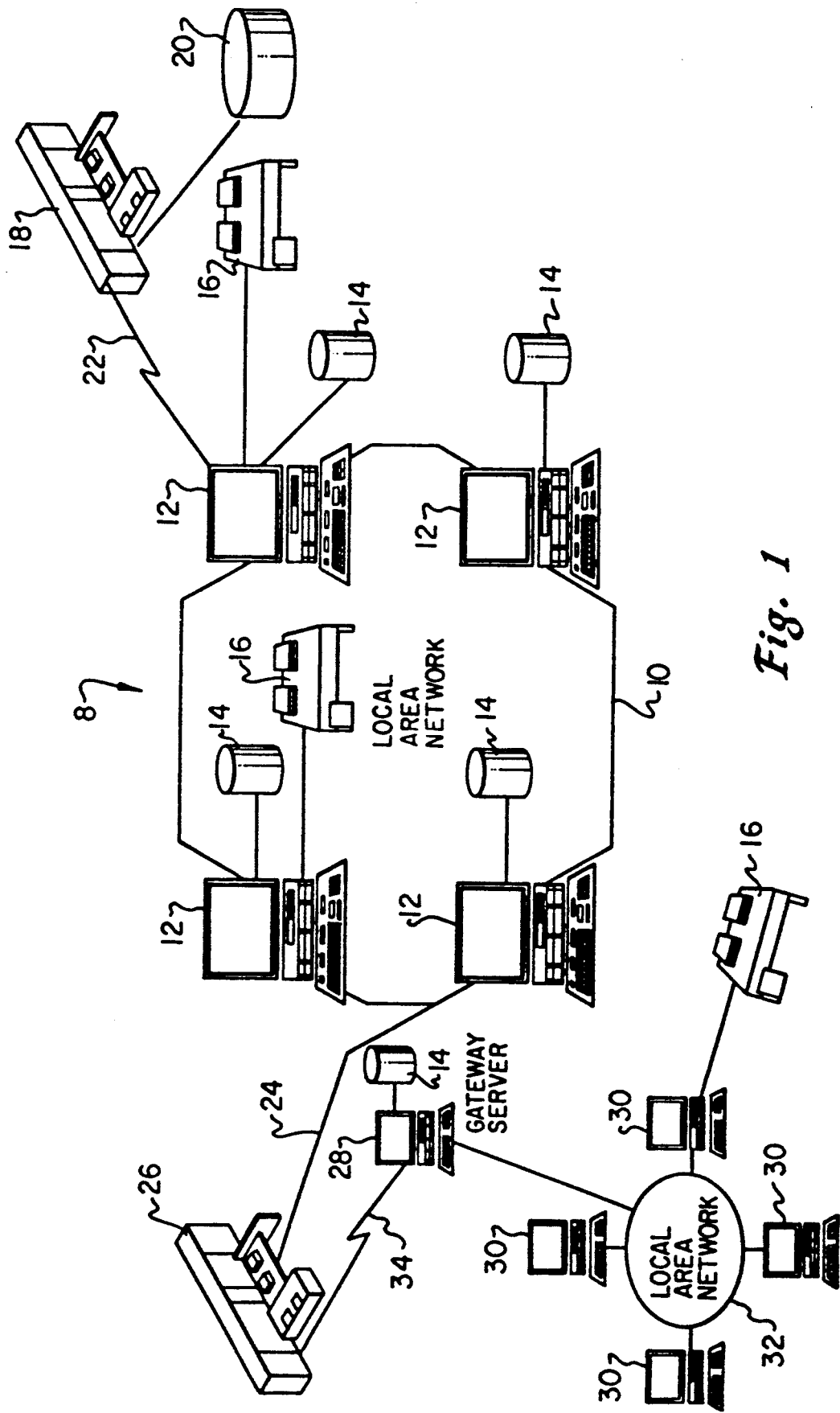
FIG. 1 is a pictorial representation of a distributed data processing system which may be utilized to implement the method and system of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network s may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. As discussed above, this is generally accomplished by listing those users authorized to access each individual data object or document, along with the level of authority that each user may enjoy with regard to a document. In this manner the authority to order the deletion of a selected document may be restricted to a single user, or a limited number of users.

However, as those skilled in the art will appreciate, the deletion of a particular document which is stored within data processing network 8 by the owner of that document, or a user with sufficient authority, may result in problems in data integrity and conflicts between users when a data object is in use by a second user or temporarily removed from a library service during the period of time when the owner requests a deletion of that document. Therefore, it should be obvious that a need exists for a method whereby a document may be conditionally deleted from a library service when that document is not in use or temporarily removed from the library service by a second user.

Figure 2:
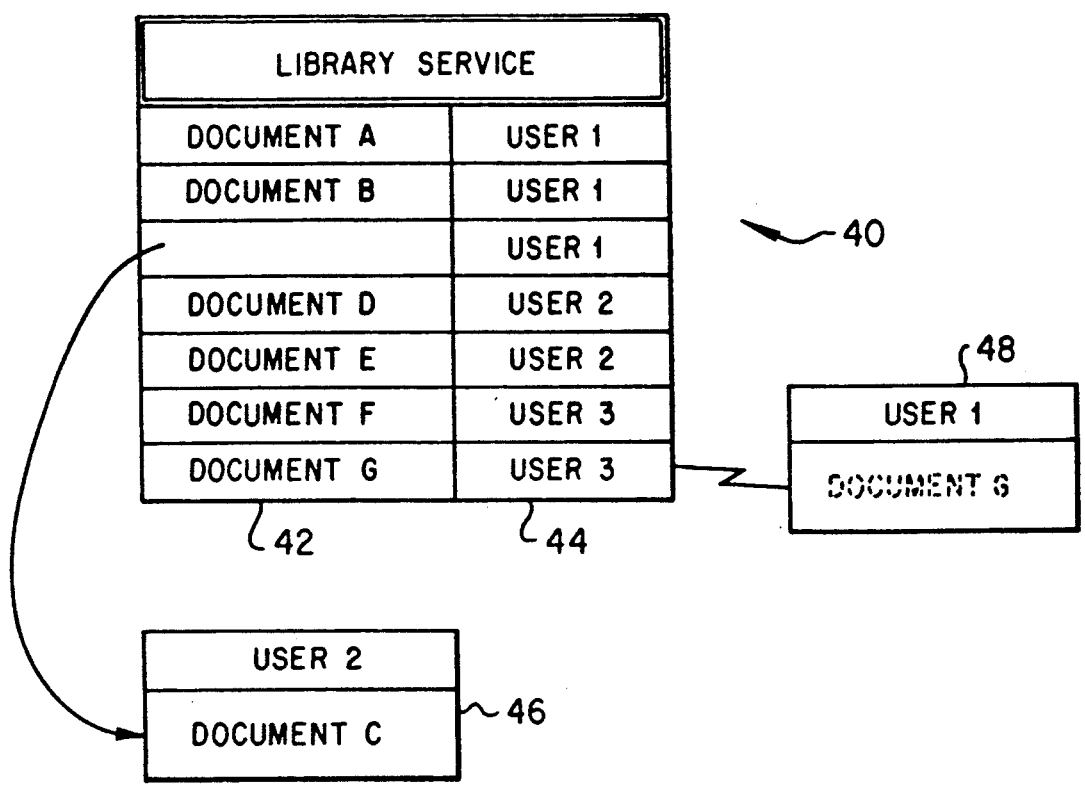
FIG. 2 is a pictorial representation of a library service within the data processing system of FIG. 1.

Referring now to FIG. 2, there is depicted a pictorial representation of a library service 40 within data processing network s of FIG. 1. As is illustrated, library service 40 includes a plurality of documents listed within column 42. Listed within column 44 are the identities of the owner of each document listed within column 42. That is, document A within library service 40 is owned by user 1 and document D is owned by user 2. By "owned" what is meant is that user having full authority for the document, including the authority to delete or modify that document in any way.

As those skilled in the art will appreciate, a document stored within library service 40 may be temporarily removed for utilization by a user, as is illustrated at reference numeral 46. Reference numeral 46 depicts a user who has removed document C from library service 40 for temporary utilization. Similarly, a user may utilize a document within library service 40 without removing that document. For example, at reference numeral 48, user 1 is graphically depicted as utilizing document G, while document G is present within library service 40.

Upon reference to the foregoing, those skilled in the art will appreciate that the deletion of document C or document G during the period of time when those documents are temporarily removed from library service 40, or in use by a user within library service 40 will result in a problem of data integrity and user conflict within data processing network 8.

Figure 3:
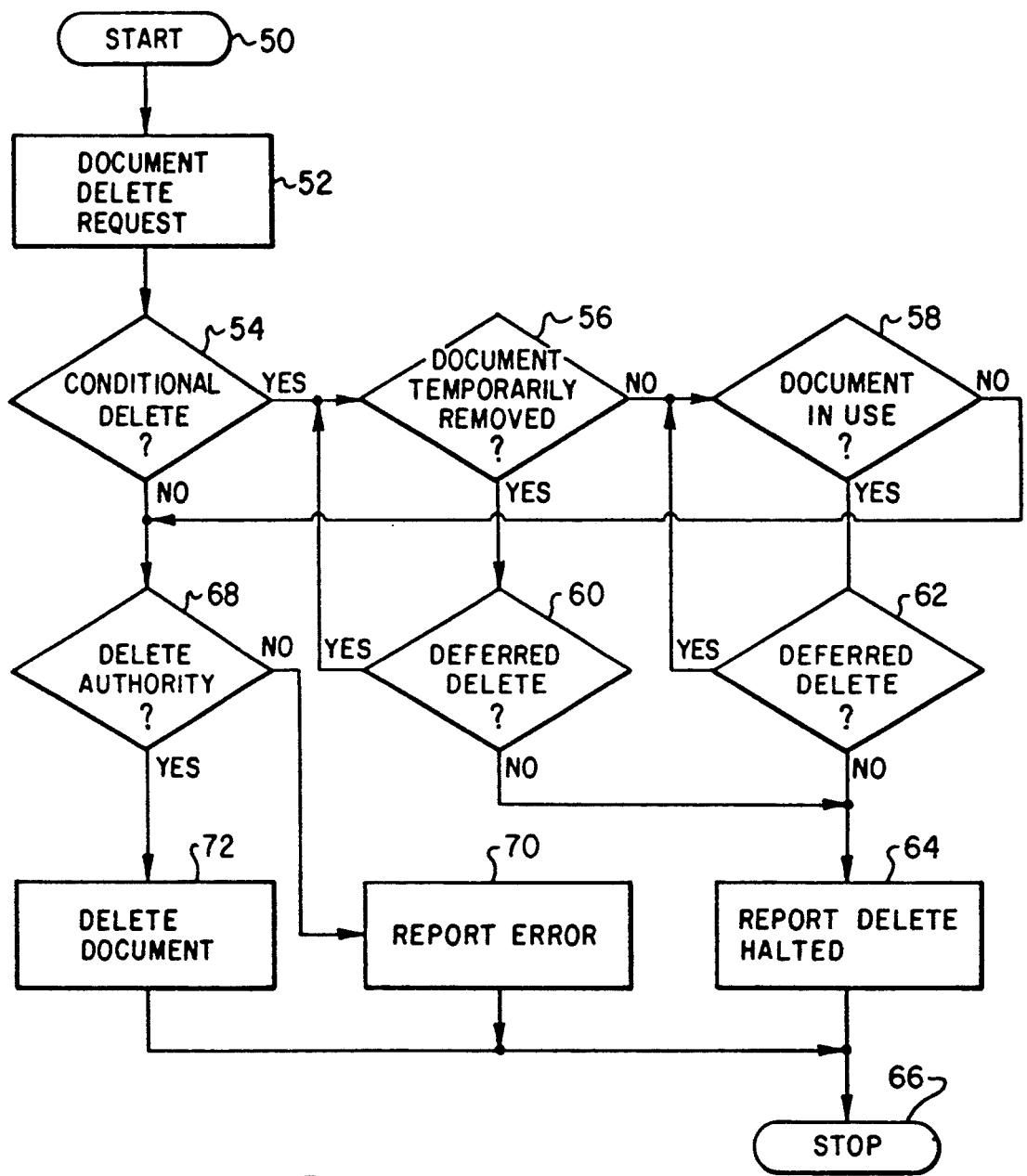
FIG. 3 is high level flow chart depicting the conditional deletion of a data object in accordance with the method and system of the present invention.

With reference now to FIG. 3, there is depicted a high level flow chart which illustrates the conditional deletion of a data object from library service 40 (see FIG. 2) in accordance with the method of the present invention. As is illustrated, the process begins at block 50 and thereafter passes to block 52 which illustrates the requesting of a document deletion by a user within data processing network 8 (see FIG. 1). Next, block 54 illustrates a determination of whether or not the user in question has requested a conditional deletion of the specified document.

In the event the user requesting the deletion of a document has not requested a conditional deletion of the document, the process passes to block 68 wherein a determination is made whether the user requesting the deletion has sufficient authority to delete the specified document. If not, block 70 illustrates the reporting of an error and the process terminates, as illustrated in block 66. However, in the event the user requesting the document deletion does possess sufficient authority to delete that document, then block 72 depicts the deletion of the document and the process again terminates, as illustrated at block 66.

Referring again to block 54, if the determination depicted therein illustrates that the user requesting the deletion of a document has requested a conditional delete, then block 56 is utilized to illustrate a determination of whether or not the document in question has been temporarily removed from the library service.

If the document has been temporarily removed from the library service, then block 60 is utilized to illustrate a determination of whether or not the deferred delete option has been requested. If a deferred deletion has been requested, the process passes to block 60 wherein a determination is made whether the user in question has requested a deferred deletion of that document. If so, the process returns iteratively to block 56 until such time as the document has been replaced in its associated library service. However, in the event the user requesting the deletion of the document in question has not requested a deferred deletion of that document, then block 64 illustrates the halting of the deletion and the reporting of this fact to the user. Thereafter, the process terminates at block 66.

Referring again to block 56, in the event the document specified by the user for conditional deletion is present within its associated library service, block 58 illustrates a determination of whether or not the document to be deleted is currently in use. As above, if the document to be deleted is currently in use, then block 62 illustrates a determination of whether or not a deferred deletion of that document has been requested. If a deferred deletion of the document has been requested, the process returns iteratively to block 58 until such time as the document to be deleted is no longer in use. However, in the event the user in question has not requested a deferred deletion of the document and the document is in use, as determined in the illustration of block 62 then the deletion of that document is halted as depicted in block 64, and a report is generated for the user requesting the deletion. Thereafter, the process again terminates, as illustrated in block 66.

Referring again to block 58, in the event a conditional deletion of a document has been requested and the document has not been temporarily removed from the library service and is not in use, the process passes from block 58 to block 68 wherein the authority of the requesting user to authorize the deletion of that document is determined. As above, in the event the user does not have sufficient authority to delete the document report, an error report is generated, as illustrated in block 70. Thereafter, the process again terminates, as illustrated in block 66. However, in the event the user in question does possess sufficient authority to authorize the deletion of the document, block 72 depicts the deletion of that document and the process terminates at block 66.

Upon reference to the foregoing those skilled in the art will appreciate that the Applicants in the present application have provided a method whereby a document stored within a data processing system may be ordered to be deleted and that deletion may be made conditional upon the document in question being present within the library service and the fact that the document is not currently in use. In the event the document has been temporarily removed or is in use, the deletion of that document is automatically halted in accordance with the method of the present invention. However, the user may also request a deferred deletion of a document such that the deletion of a document which has been temporarily removed from a library service or a document which is currently in use will be automatically deferred until such time as the document has been returned to the library service or is no longer in use.

While the invention has been particularly shown and described with reference to a preferred embodiment, it will be understood by those skilled in the art that various changes in form and detail may be made therein without departing from the spirit and scope of the invention.

We claim:

1. A method in a data processing system having a plurality of data objects stored within a library service for use or temporary removal by a system user, for controlling the deletion of a selected data object, said method comprising the data processing system implemented steps of:

determining if a request made by a selected user to delete a selected data object within a library service is a deletion request or a conditional deletion request in response to each request to delete a data object within said library service;

in response to each deletion request, determining if said selected user has authority to delete said selected data object and if said selected user has said authority, automatically deleting all references to said selected data object from said library service regardless of whether or not said selected data object is in use or temporarily removed by a system user;

in response to each conditional deletion request, automatically determining if said selected data object is in use or temporarily removed by a system user;

automatically determining if said selected user has authority to delete said selected data object and if said selected user has said authority, deleting all references to said selected data object from said library service in response to a conditional deletion request if said selected data object is not in use or temporarily removed by a system user; and automatically terminating said request to delete said selected data object in response to a conditional deletion request if said selected data object is in use or temporarily removed by a system user.

2. A data processing system having a plurality of data objects stored within a library service therein for use or temporary removal by a system user, for controlling the deletion of a selected data object, said data processing system comprising:

means for determining if a request made by a selected user to delete a selected data object within a library service is a deletion request or a conditional deletion request in response to each request to delete a data object within said library service;

means for determining if said requester has authority to delete said selected data object;

means for automatically deleting all references to said selected data object from said library service in response to each deletion request if said selected user has authority to delete said selected data object, regardless of whether or not said selected data object is in use or temporarily removed by a system user;

means for automatically determining if said selected data object is in use or temporarily removed by a system user in response to each conditional deletion request;

means for automatically deleting all references to said selected data object from said library service in response to each conditional deletion request if said selected data object is not in use or temporarily removed by a system user; and if said selected user has said authority to delete said selected data object, and means for automatically terminating said request to delete said selected data object in response to a conditional deletion request if said selected data object is in use or temporarily removed by a system user.

* * * * *

UNITED STATES PATENT AND TRADEMARK OFFICE
CERTIFICATE OF CORRECTION

PATENT NO. : 5,297,278
DATED : March 22, 1994
INVENTOR(S) : Daina S. Wang, Et al.

It is certified that error appears in the above-identified patent and that said Letters Patent is hereby corrected as shown below:

Column 3, lines 2 and 60, please change "s" to --8--.

Signed and Sealed this

Second Day of August, 1994

Attest:

BRUCE LEHMAN

Attesting Officer    Commissioner of Patents and Trademarks